United States Patent
Kim et al.

(10) Patent No.: US 6,360,843 B1
(45) Date of Patent: Mar. 26, 2002

(54) NOISE DAMPING DEVICE OF ROTATION DRIVING APPARATUS

(75) Inventors: Seong-hoon Kim; Byeong-cheon Koh, both of Sungnam; Byoung-young Bae, Pyungtack; Soon-kyo Hong, Seoul; Sung-jin Lee, Gwangmyung, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/339,173

(22) Filed: Jun. 24, 1999

(30) Foreign Application Priority Data

Jun. 26, 1998 (KR) .............................. 98-24410

(51) Int. Cl.⁷ .................................. F16F 7/00
(52) U.S. Cl. ................... 181/207; 369/247; 369/263; 360/97.2
(58) Field of Search ................ 181/207, 208, 181/209; 369/247, 263; 360/97.2

(56) References Cited

U.S. PATENT DOCUMENTS 5,761,184 A * 6/1998 Dauber et al. ............... 369/247
5,781,373 A * 7/1998 Larson et al. ............. 360/97.02
6,097,568 A * 8/2000 Ekhoff ....................... 360/97.02
6,177,173 B1 * 1/2001 Nelson ........................ 181/207

* cited by examiner

Primary Examiner—Khanh Dang
(74) Attorney, Agent, or Firm—Sughrue Mion, PLLC

(57) ABSTRACT

A noise damping device of a rotation driving apparatus includes a housing; and at least one rotating disk installed to be rotated by a driving source within the housing. The rotating disk and the housing are assembled to satisfy the following Equation $$\delta_m < h < \delta_m + 1.5\delta_f$$

$\delta_m$ is the thickness of air layers which move from the rotation center of the rotating disk to the outside thereof and are distributed around the rotating disk when the rotating disk rotates at a normal operating speed. $\delta_f$ is the thickness of air layers which move from the outside of the rotating disk to the rotation center thereof and are distributed around the upper inside surface and the base surface of the housing, which face the rotating disk. h is the distance between the rotating disk and the upper inside surface or the base surface of the housing.

5 Claims, 3 Drawing Sheets

NOISE DAMPING DEVICE OF ROTATION DRIVING APPARATUS

BACKGROUND OF THE INVENTION

1. Field of the Invention

The present invention relates to a noise damping device of a rotation driving apparatus, which can dampen noise caused by air flow generated when disks such as hard disks installed within a housing are rotated.

2. Description of the Related Art

As an example of a rotation driving apparatus, a hard disk drive (HDD) shown in FIG. 1 comprises a housing including a base frame 12 installed in a computer main body (not shown) for supporting hard disks 18 and a cover frame 14 assembled to the base frame 12 for protecting the hard disks 18, and a noise damping device.

The hard disks 18 are rotated by a driving source such as a spindle motor (not shown) installed on the base frame 12 so that a predetermined data recording/reproducing means (not shown) can record data on the hard disks 18 or reproduce the data recorded on the hard disks 18.

The noise damping device is attached to the outer surface of the cover frame 14 by an adhesive such as a bond or a double-sided bonding tape so that the noise damping device can absorb noise generated within the housing 10, and comprises a damper member 16 usually manufactured of stainless steel in a thin plate structure.

In the above structure, when the hard disks 18 are rotated at high speed so as to record data on the hard disks 18 or reproduce the recorded data, noise is generated within the housing 10.

The noise can be classified into, for example, a structure-borne sound such as a solid-borne sound generated when impact and vibrations which a structural body experiences from a driving source propagate through the structural body, and a pneumatic or flow sound such as an air-borne sound generated when a structural body is forcibly vibrated by air flow. The air-borne sound is generated by an irregular eddy flow between a first boundary layer 22 and a second boundary layer 24 wherein the first boundary layer 22 flows in a direction away from a rotation center D between the hard disks 18 and the cover frame 14, and the second boundary layer 24 flows from outer sides to the rotation center D as shown in FIG. 2.

The noise generated in the housing 10 can be absorbed and reduced, to a certain extent, by the damper member 16. However, in the above conventional art, since the damper member 16 for damping noise must be separately attached to the outer surface of the housing 10, the manufacturing cost is high and more assembly operations are required. In addition, when the temperature within the computer main body rises, the bonding force of the adhesive deteriorates due to heat generated in the computer main body.

SUMMARY OF THE INVENTION

To solve the above problems, it is an objective of the present invention to provide a noise damping device of a rotation driving apparatus, the structure of which is improved so that noises can be dampened by fundamentally suppressing abnormal air flow generated when disks rotate within a housing.

Accordingly, to achieve the above objective, there is provided a noise damping device of a rotation driving apparatus comprising: a housing; and at least one rotating disk installed to be rotated by a driving source within the housing, wherein the rotating disk and the housing are assembled to satisfy the following Equation, $$\delta_m < h < \delta_m + 1.5\delta_f$$

where $\delta_m$ is the thickness of air layers which move from a rotation center of the rotating disk to the outside thereof and are distributed around the rotating disk when the rotating disk rotates at a normal operating speed, $\delta_f$ is the thickness of air layers which move from the outside of the rotating disk to the rotation center thereof and are distributed around an upper inside surface and the base surface of a housing, which face the rotating disk, and h is the distance between the rotating disk and the upper inside surface or the base surface of the housing.

In addition, it is preferable that the housing includes a base frame for supporting the rotating disk, and a cover frame assembled to the base frame to cover the rotating disk. The cover frame is installed on the base frame so that the following Equation can be satisfied, $$\delta_m < h1 < \delta_m + 1.5\delta_f$$

where h1 is the distance between the rotating disk and the cover frame.

Additionally, it is preferable that the rotating disk is installed on the base frame so that the following Equation can be satisfied, $$\delta_m < h2 < \delta_m + 1.5\delta_f$$

where h2 is the distance between the rotating disk and the base frame.

BRIEF DESCRIPTION OF THE DRAWINGS

Other features and advantages of the present invention will become more apparent by describing in detail preferred embodiments thereof with reference to the attached drawings in which.

DESCRIPTION OF THE PREFERRED EMBODIMENTS

Figure 3:
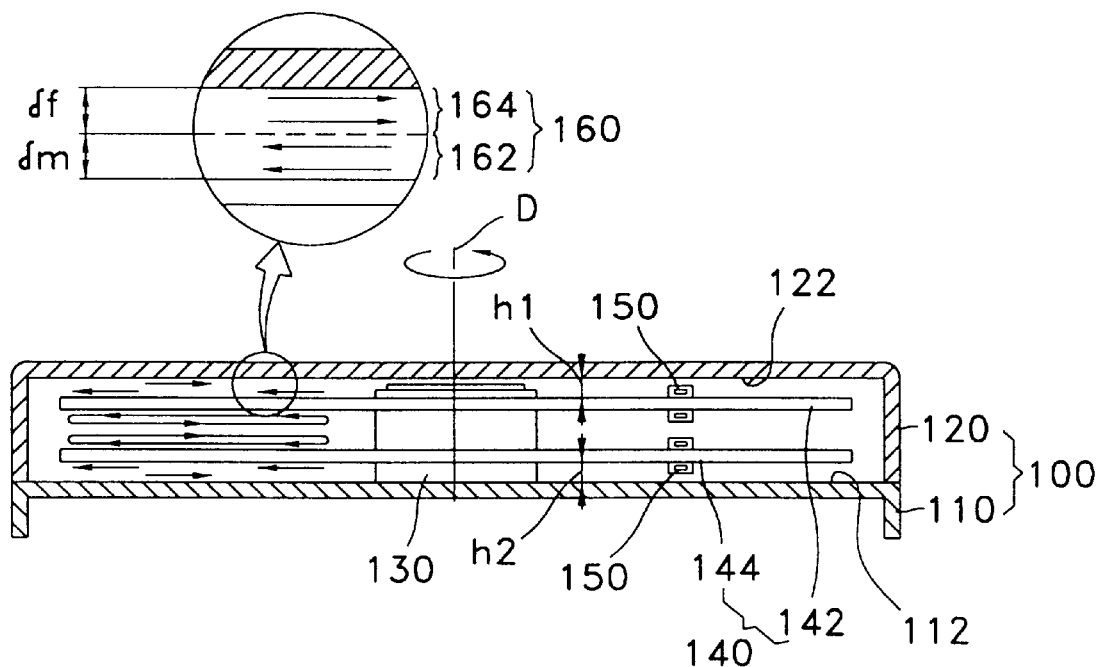
FIG. 3 is a schematic sectional view illustrating a noise damping device of a rotation driving apparatus according to a preferred embodiment of the present invention.

Referring to FIG. 3, a noise damping device of a rotation driving apparatus according to a preferred embodiment of the present invention includes a housing 100, hard disks 140 installed within the housing and a spindle motor 130 for rotating the hard disks 140.

The housing 100 includes a base frame 110 for supporting the spindle motor 130, and a cover frame 120 assembled to the base frame 110 for protecting the hard disks 140.

The hard disks 140 are stacked with a first disk 142 and a second disk 144 for increased data storage capacity. Heads 150 which are moved by a predetermined moving means within the housing 100 record data on the hard disks 140 and reproduce the recorded data.

In order to dampen noise generated when the hard disks 140 rotate, the hard disks 140 and the housing 100 are assembled so that the distance h1 between the hard disks 140 and the inner upper surface 122 of the housing 100 and/or the distance h2 between the hard disks 140 and the inner base surface 112 of the housing 100 satisfy Equation (1)

$$\delta_m < hi < \delta_m + 1.5\delta_f (i=1, 2) \quad (1)$$

where $\delta_m$ and $\delta_f$ are the thicknesses of the first and second boundary layers 162 and 164, respectively, when a boundary layer 160 of air flowing within the housing 100 is divided according to the flow direction when the hard disks 140 rotate at a normal operating speed.

Here, Equation (1) is derived from Equation (2) which theoretically expresses the thickness δ of the boundary layer 160 (usually called Eckman layer) composed of the first and second boundary layers 162 and 164, $$\delta \approx \sqrt{\frac{u}{\Omega}} \; (\delta_f > \delta_m) \quad (2)$$

where δ is the thickness of the boundary layer 160 in mm, u is the dynamic viscosity of fluid in cm$^2$/sec, and Ω is the angular velocity of the hard disks 140 in revolutions/min.

Theoretically, in order to prevent friction between the hard disks 140 and the cover frame 120 and suppress the formation of an eddy flow layer, it is sufficient that the distances h1 and h2 are both less than δ. However, in reality, since the thickness $\delta_f$ of the second boundary layer 164 becomes thick due to a predetermined gap dθ between the outer edge of the hard disks 140 and the inner side surface of cover frame 120, there is a blowing effect. Therefore, the actual thickness of the second boundary layer is 1.5$\delta_f$, which is larger than the theoretical value by about 20~30%. Hence, the distances h1 and h2 must be smaller than the sum of the thickness $\delta_m$ of the first boundary layer 162 and the actual thickness 1.5$\delta_f$.

Figure 1:
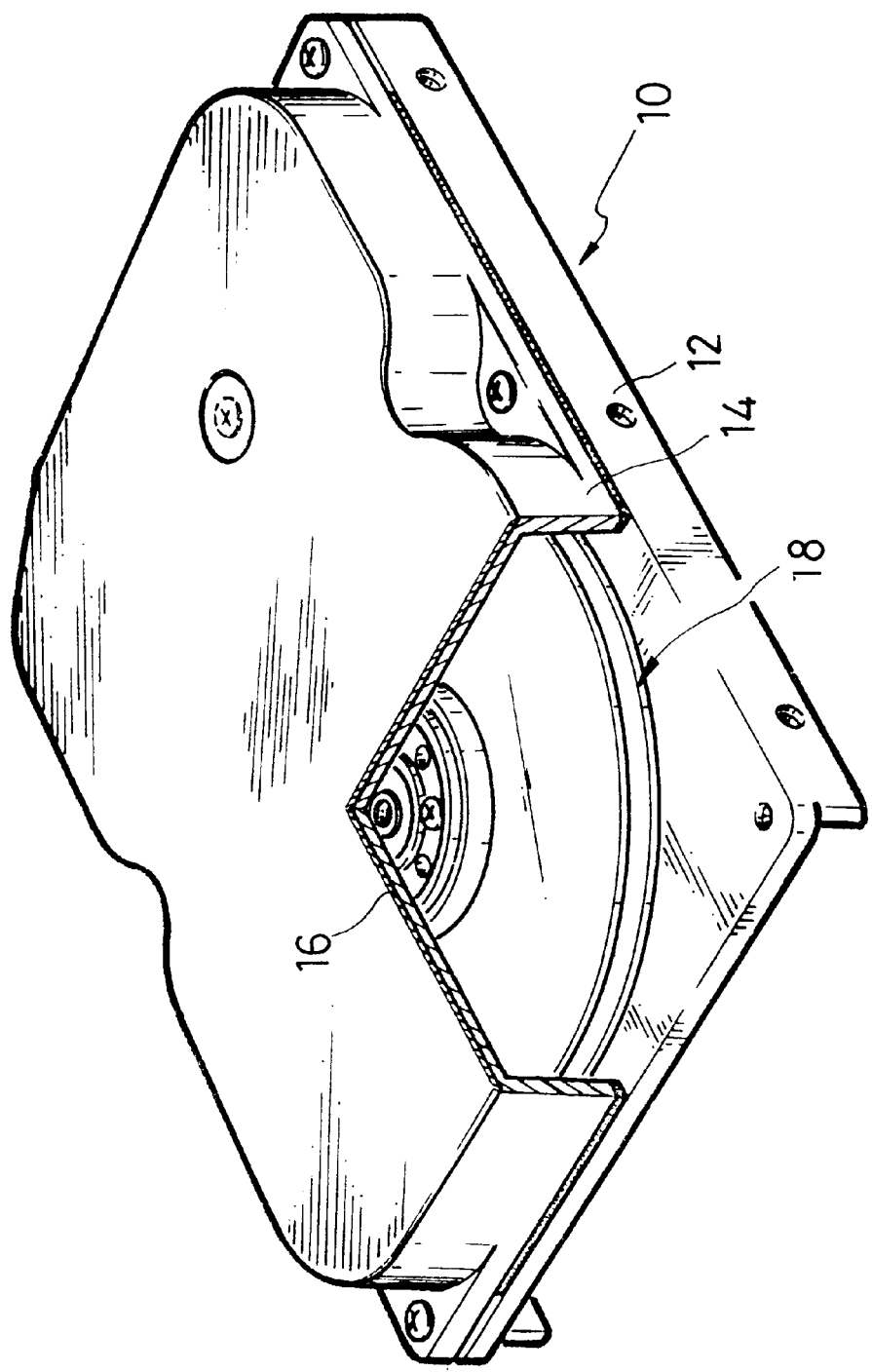
FIG. 1 is a partially cut away perspective view illustrating a conventional hard disk drive.
Figure 2:
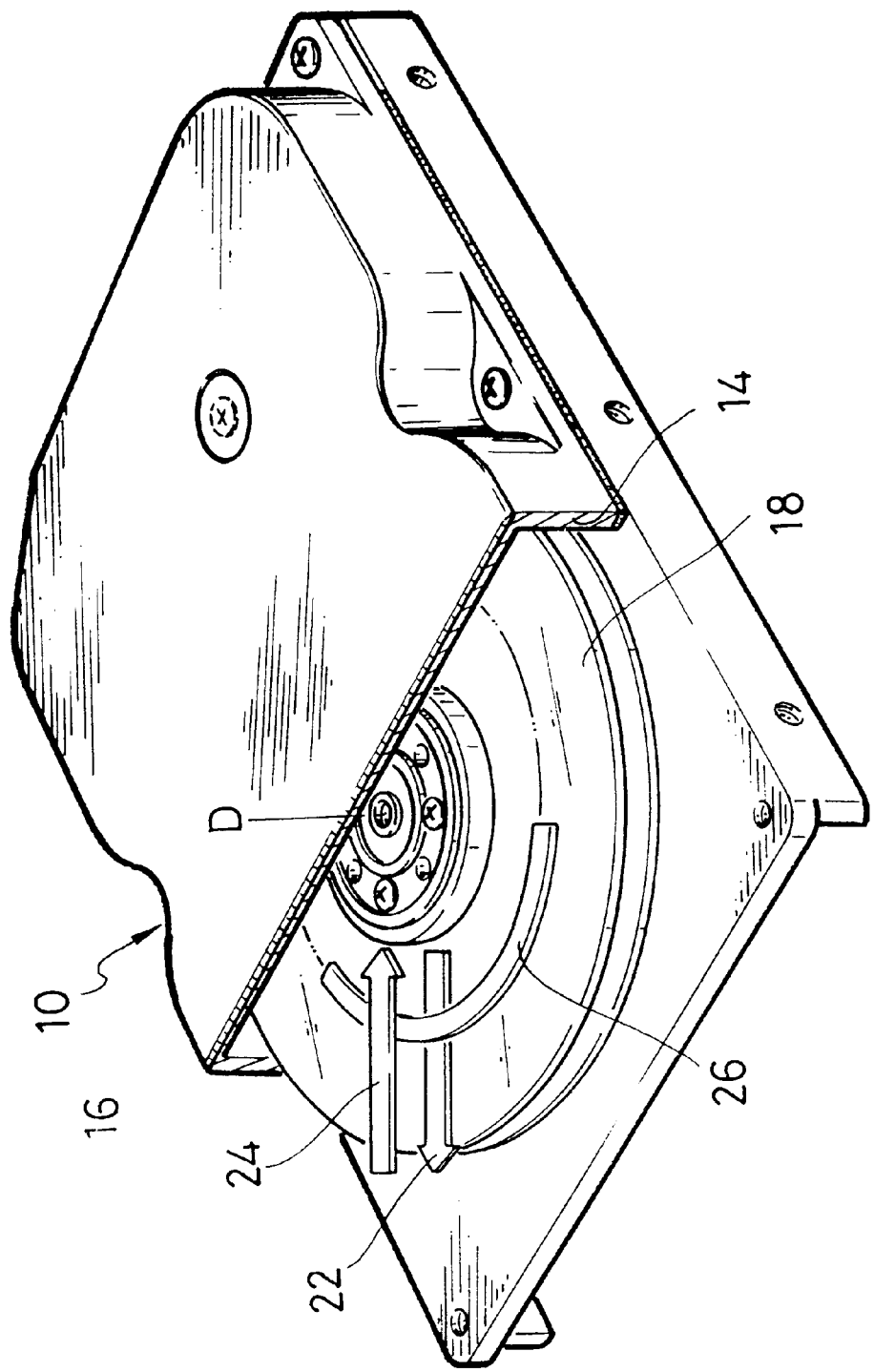
FIG. 2 is a partially cut away perspective view for describing the operation of the hard disk drive shown in FIG. 1.

The cover frame 120 may be designed so that the distance h1 can satisfy Equation (1) by attaching an auxiliary member (not shown) of a predetermined thickness on the inner side surface of a conventional cover frame 14 (please refer to FIG. 1).

The operation of a rotation driving apparatus according to a preferred embodiment of the present invention will be described with reference to Table 1.

When the rotation speed Ω of the hard disks 140 is 5,400 rpm, the theoretical thickness δ of the boundary layer 160 based on Equation 2 is about 0.17 mm, and when the rotation speed Ω is 7,200 rpm, the theoretical thickness δ is about 0.15 mm. In addition, in an ideal case in which there is no structural body around the hard disks 140, the thickness $\delta_m$ of the first boundary layer 162 is about 4δ and the thickness $\delta_f$ of the second boundary layer 164 is about 8δ. Therefore, even though the sum of the theoretical thicknesses of the two boundary layers 162 and 164, i.e., $\delta_m + \delta_f = 12\delta$ is about 2.04 mm, the actual thickness $\delta_m + \delta_f = 12\delta$ is about 2.3~2.5 mm due to the blowing effect and is thicker than the theoretical thickness.

TABLE 1

| | h1 [mm] | Noise [dBA] |
|---|---|---|
| First Experimental Example | 4 | 35.5 |
| Second Experimental Example | 3 | 34.0 |

TABLE 1-continued

| | h1 [mm] | Noise [dBA] |
|---|---|---|
| Third Experimental Example | 2.7 | 33.3 |
| Fourth Experimental Example | 2.5 | 32.8 |
| Fifth Experimental Example | 2.3 | 32.7 |
| Comparative Example | 5 | 35.2 |

Referring to Table 1, in the Comparative Example in which a conventional damper member 16 (FIG. 1) was attached on the outside of the housing 10 and the distance h1 was 5 mm, measured noise was 35.2 dBA; however in the fifth Experimental Example in which the distance h1 was 2.3 mm, measured noise was 32.7 dBA and was reduced by about 2.5 dBA in comparison to the Comparative Example. Hence, if the housing 100 and the hard disks 140 are designed so that the distance h1 can satisfy the conditions of Equation 1, the formation of an eddy flow layer can be suppressed and noise can be effectively reduced even without a conventional damper 16.

In addition, it can be seen that less noise was generated when the distance h1 was smaller within the range satisfying Equation (1). Also, when the rotation speed Ω of the hard disks was 5,400 rpm and the distance h1 was larger than the thickness $\delta_m$ of the first boundary layer 162, the thickness $\delta_m$ of the first boundary layer 162 could be less than about 0.7~0.8 mm and the possible drag force between the hard disks 140 and the cover frame 120 could be prevented in advance.

Further, noise generated when the hard disks 140 are upon installation tilted due to the assembly tolerance of the hard disks 140 or when the center of mass and the rotation center D of the hard disks 140 do not coincide with each other, can be effectively reduced by determining the distances h1 and h2 to satisfy Equation (1).

The following Table 2 shows noise values of experimental results of first, second, and third Experimental Examples and a Comparative Example. In the first Experimental Example, noise generated with the housing 100 was measured when the hard disks 140 were tilted. In the second Experimental Example, noise was measured when the center of mass and the rotation center D of the hard disks 140 did not coincide with each other. In the third Experimental Example, noise was measured when the hard disks 140 were tilted and the distance h1 was determined to satisfy Equation 1, i.e., h1=2.5 mm, and in the Comparative Example, noise was measured when a conventional damper member 16 (FIG. 1) was attached to the housing 100.

TABLE 2

| | Noise [dBA] |
|---|---|
| First Experimental Example | 34.7 |
| Second Experimental Example | 37.2 |
| Third Experimental Example | 33.3 |
| Comparative Example | 35.0 |

Referring to Table 2, even though the first Experimental Example had minimal influence on noise in comparison with the Comparative Example, the second Experimental Example generated noise greater than the Comparative Example by about 2.2 dBA. In addition, the third Experimental Example had reduced noise by about 4 dBA in comparison with the second Experimental Example.

Even though this embodiment has been described mainly in connection with the distance h1 between the cover frame 120 and the hard disks 140, noise can be reduced when the distance h2 is determined to satisfy Equation 1.

It is contemplated that numerous modifications may be made to the present invention without departing from the spirit and scope of the invention as defined in the claims.

What is claimed is:

1. A noise damping device of a rotation driving apparatus comprising:

a housing; and at least one disk rotatable mounted within the housing, wherein the disk and the housing are assembled to satisfy the following Equation, $$\delta_m < h < \delta_m + 1.5\delta_f$$

where $\delta_m$ is a thickness of air layers which move from a rotation center of the disk to an outside thereof and are distributed around the disk when the disk rotates at a normal operating speed, $\delta_f$ is a thickness of air layers which move from the outside of the disk to the rotation center thereof and are distributed around an upper inside surface and a base surface of the housing, which face the disk when the disk rotates at a normal operating speed, and h is a distance between the disk and the upper inside surface or the base surface of the housing.

2. The noise damping device of claim 1, wherein the at least one disk is rotated by a driving source within the housing.

3. The noise damping device of claim 1, wherein the housing includes a base frame for supporting the at least one disk and a cover frame assembled to the base frame for covering the at least one disk.

4. A noise damping device of a rotation driving apparatus comprising:

a housing having a base frame and a cover frame assembled to the base frame, and a first and second disk positioned within the housing, wherein the cover frame is installed on the base frame so that the following Equation is satisfied, $$\delta_m < h1 < \delta_m + 1.5\delta_f$$

where $\delta_m$ is a thickness of air layers which move from a rotation center of the first and second disks to an outside thereof and are distributed around the disks when the disks rotate at a normal operating speed, $\delta_f$ is a thickness of air layers which move from the outside of the first and second disks to the rotation center thereof and are distributed around an upper inside surface and a base surface of the housing, which face the disks when the disks rotate at a normal operating speed and where h1 is the distance between the first disk and the cover frame.

5. The noise damping device of a rotation driving apparatus as claimed in claim 4, wherein the second disk is installed on the base frame so that the following Equation is satisfied, $$\delta_m < h2 < \delta_m + 1.5\delta_f$$

where h2 is the distance between the second disk and the base frame.

\* \* \* \* \*